(12) United States Patent
Isayama et al.

(10) Patent No.: US 7,802,831 B2
(45) Date of Patent: Sep. 28, 2010

(54) LOCKING STRUCTURE

(75) Inventors: Hiroyuki Isayama, Wako (JP); Hajime Seino, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/243,157

(22) Filed: Oct. 1, 2008

(65) Prior Publication Data

US 2009/0090147 A1    Apr. 9, 2009

(30) Foreign Application Priority Data

Oct. 3, 2007    (JP)    ............................. 2007-259978

(51) Int. Cl.
  *B60R 7/04*    (2006.01)
(52) U.S. Cl. .................... 296/24.34; 296/37.8
(58) Field of Classification Search ............. 296/24.34, 296/37.8, 37.12, 37.13, 37.14, 70, 72; 224/483, 224/511, 517, 539, 544, 545
See application file for complete search history.

(56) References Cited

U.S. PATENT DOCUMENTS

| 4,212,415 | A | 7/1980 | Neely |
| 6,179,359 | B1 | 1/2001 | Clauson et al. |
| 7,008,003 | B1 * | 3/2006 | Hirose et al. ............. 296/146.7 |
| 7,360,964 | B2 * | 4/2008 | Tsuya et al. ................. 403/280 |
| 2005/0054229 | A1 * | 3/2005 | Tsuya et al. ................. 439/280 |
| 2007/0107174 | A1 | 5/2007 | Bordas |

FOREIGN PATENT DOCUMENTS

| DE | 199 01 892 | 7/1999 |
| JP | 11-208316 | 8/1999 |
| JP | 2004-196083 | 7/2004 |

* cited by examiner

*Primary Examiner*—Glenn Dayoan
*Assistant Examiner*—Gregory Blankenship
(74) *Attorney, Agent, or Firm*—Rankin, Hill & Clark LLP

(57) ABSTRACT

Locking structures each include a locking claw portion formed on a desired object, and a locking clamp mechanism formed on at least one of left and right wall portions of a console device. The clamp mechanism has a fitting hole portion formed in the wall portion for fitting therein of the locking claw portion, a locking support portion for lockingly supporting the claw portion fitted in the fitting hole portion, and a pair of opposed movement-preventing projecting portions formed on opposite ends of the support portion for preventing movement of the object between the opposite ends. The clamp mechanism also having a resiliently-deformable elastic portion formed integrally with the wall portion to extend into the hole portion for resiliently pressing the claw portion against the support portion.

9 Claims, 7 Drawing Sheets

LOCKING STRUCTURE

FIELD OF THE INVENTION

The present invention relates to an improved locking structure for lockingly attaching a desired object to a wall portion of a console device.

BACKGROUND OF THE INVENTION

Generally, in vehicle compartments, there are employed locking structures for lockingly attaching desired objects to wall portions of various components of the vehicle. Such locking structures are disclosed, for example, in Japanese Patent Application Laid-Open Publication No. 2004-196083 (JP 2004-196083 A). According to the disclosure of JP 2004-196083, a plurality of locking structures are provided on a console device disposed between a driver set and a front passenger seat, and a center cap is mounted, via the locking structures, in a working opening section formed in the console device, to close the working opening section. As the center cap is placed on mounting seating surface portions, formed on peripheral edges of the working opening section, with claw portions of the center cap fitted in the seating surface portions so that small-width flat surface portions, provided on opposed edges of a brake-lever mounting opening portion communicating with the working opening section, are held between claw-shaped portions and projections of the center cap, flanges of the center cap, located over the projections, climb onto the small-width flat surface portions so that the flanges ultimately lie flush with the upper end of the brake-lever mounting opening portion.

However, in order to attach another member (i.e., another desired object) after the locking attachment of the center cap to the console device disclosed in JP 2004-196083 A, there would arise a need to provide, in addition to the locking structures for the center cap, locking support structures on the peripheral edges of the opening section of the console device or mounting structures on the center cap. In the former case, a storage space defined by the center cap and the console device body would be considerably reduced due to the provision of the additional locking support structures, while, in the latter case, design freedom would be considerably limited because some measure for increasing the mechanical strength of the center cap is required. Therefore, there has been a demand for an improved locking structure which can reliably lockingly attach another member or object, such as an accessory, on the console device of the vehicle without adversely influencing the other member or object and without reducing the storage space defined by the center cap and the console device body.

SUMMARY OF THE INVENTION

In view of the foregoing prior art problems, it is an object of the present invention to provide an improved locking structure which can lockingly attach a desired object to a wall portion of a console device with a minimized space between the desired object and the wall portion and hence without reducing a storage space of the console device.

In order to accomplish the above-mentioned object, the present invention provides an improved locking structure for lockingly attaching a desired object to a wall portion of a console device, which comprises a locking claw portion formed on the desired object, and a locking clamp mechanism formed on the wall portion. The locking clamp mechanism having a fitting hole portion formed in the wall portion for fitting therein of the locking claw portion of the desired object, a locking support portion for lockingly supporting the locking claw portion fitted in the fitting hole portion, a pair of opposed movement-preventing projecting portions formed on opposite ends of the locking support portion for preventing movement or displacement of the desired object toward (i.e., between) the opposite ends, and an elastic portion extending from the wall portion for resiliently pressing the locking claw portion against the locking support portion.

Because the locking clamp mechanism of the inventive locking structure has the fitting hole portion formed in the wall portion for fitting therein of the locking claw portion of the desired object, the locking support portion for lockingly supporting the locking claw portion fitted in the fitting hole portion, the opposed movement-preventing projecting portions formed on to the opposite ends of the locking support portion for preventing movement or displacement of the desired object toward (i.e., between) the opposite ends and the elastic portion formed on the wall portion for resiliently pressing the locking claw portion against the locking support portion, the locking support portion bulges from the wall portion by only a small amount, the desired object can be disposed very close to the wall portion of the console device with a minimized space between the wall portion and the desired object.

Further, as the locking claw portion of the desired object is fitted into the fitting hole portion, the locking claw portions come to rest on the locking support portion continuous with the edge of the fitting hole portion, so that a load or weight of the desired object can be appropriately supported by the locking support portion. Thus, the desired object can be supported with an increased reliability.

Further, as the locking claw portion of the desired object is fitted into the fitting hole portion, the locking claw portion is brought into face-to-face abutment with the opposed movement-preventing projecting portions to be sandwiched between the movement-preventing projecting portions, the desired object can be effectively prevented from undesirably jolting between the movement-preventing projecting portions and thus can be reliably supported in a predetermined position without being displaced parallel to the wall portion between the movement-preventing projecting portions.

Preferably, the desired object has the locking claw portion on each of its opposite (e.g., left and right) side walls, and the locking clamp mechanism is formed on each of opposed (e.g., left and right) wall portions of the console device. Namely, two locking structures constructed according to the present invention are provided, so that the desired box can be lockingly attached at its opposite sides to the opposed wall portions and thus can be appropriately kept supported in the predetermined position with an even further enhanced reliability.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
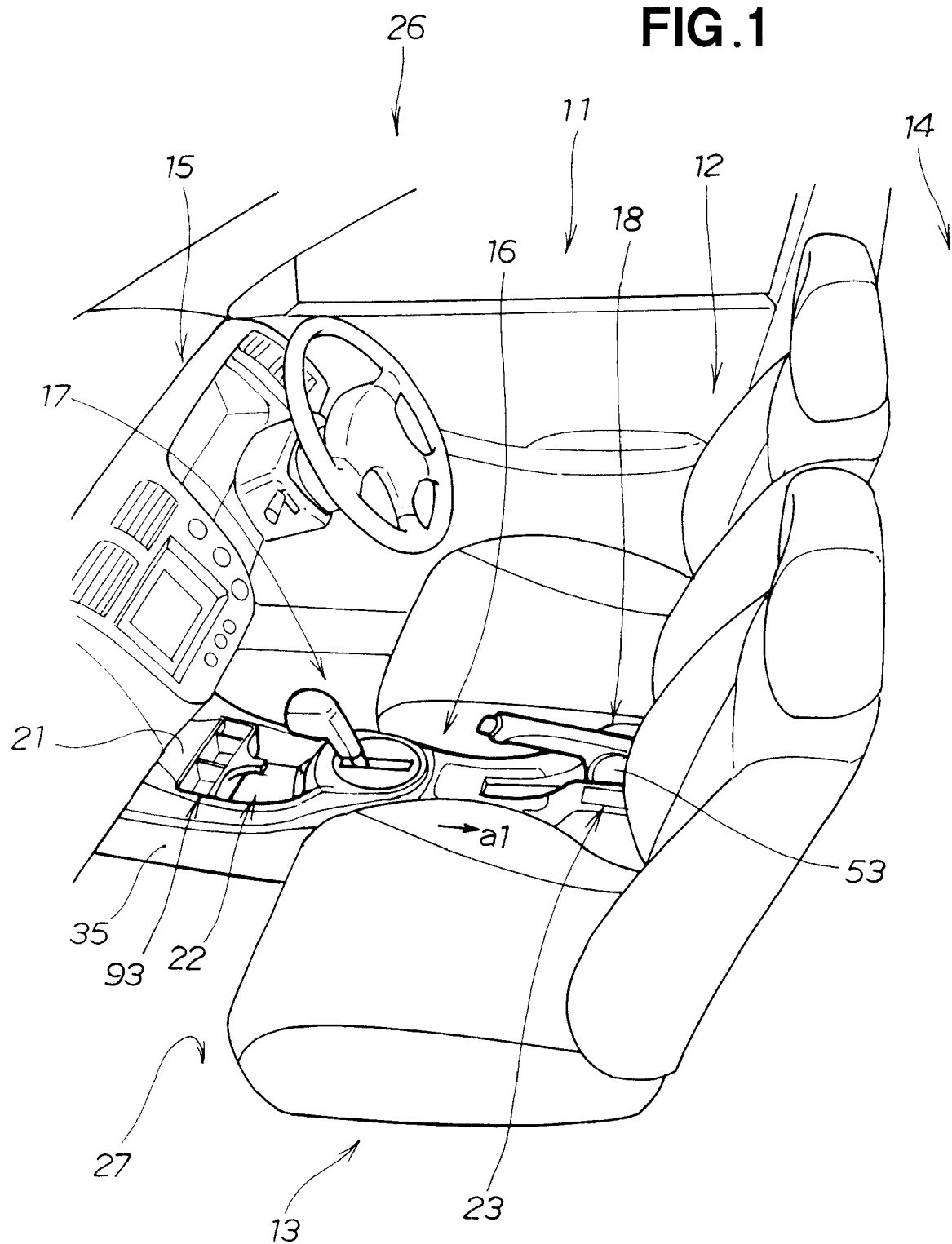
FIG. 1 is a perspective view showing a compartment of a vehicle and more particularly a center console employing locking structures of the present invention.

FIG. 1 is a perspective view showing a compartment 11 of a vehicle 26 and more particularly a center console 16 employing locking structures of the present invention.

In the vehicle compartment 11, there are provided a driver seat 12, a front passenger seat 13, rear seats 14, an instrument panel 15, the center console (box) 16, a shift lever mechanism 17 and a parking brake lever mechanism 18.

The center console 16 is disposed between the driver seat 12 and the front passenger seat 13, and it includes a front storage section 21 located proximate to the instrument panel 15, a front cup holder 22 located rearwardly (i.e., as indicated by arrow a1) of the front storage section 21 and a CD case section 23. For example, the vehicle 26 employs an automatic transmission (AT), and the shift lever mechanism 17 of the automatic transmission is disposed on a floor or underbody 27.

Figure 2:
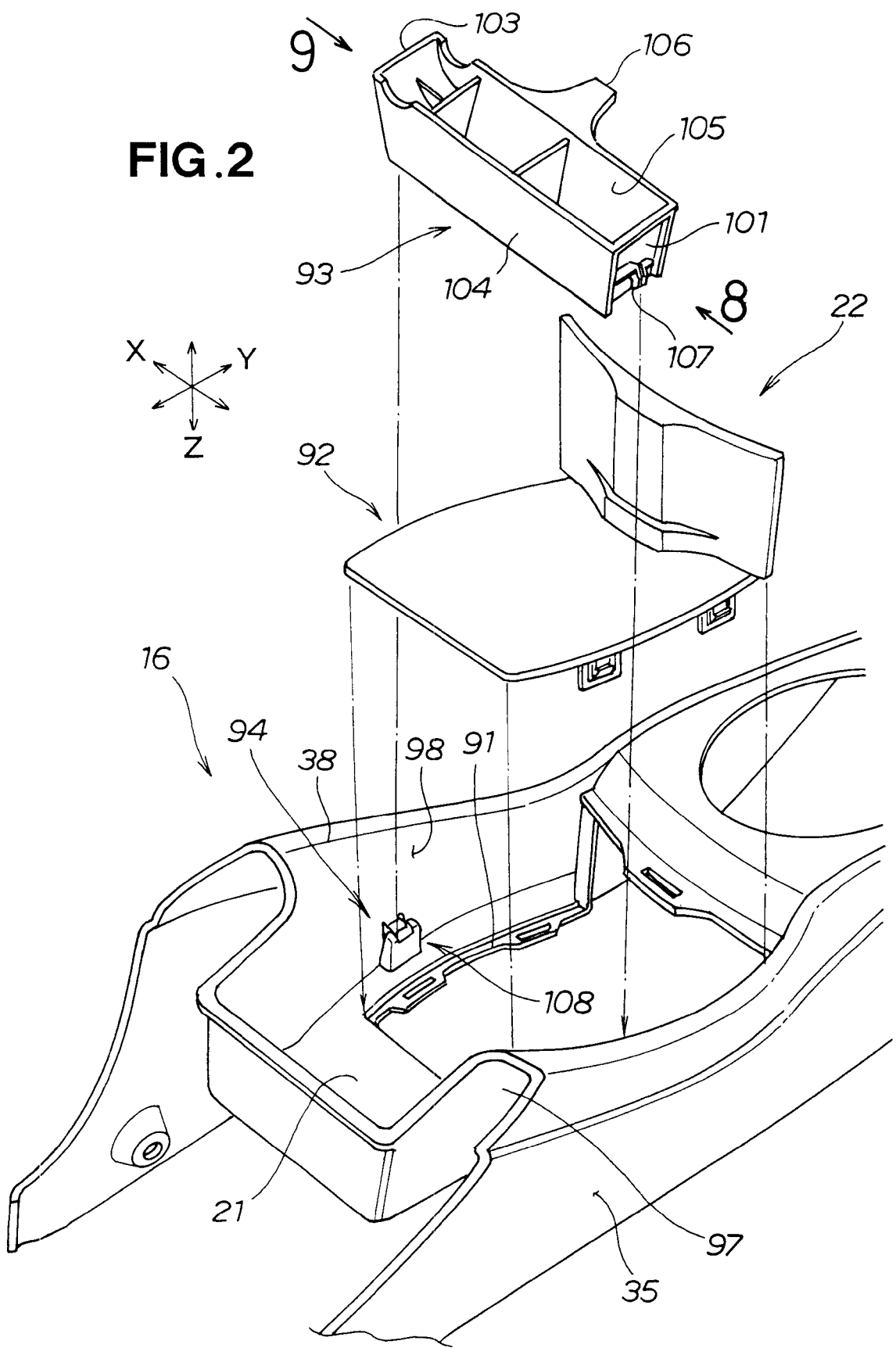
FIG. 2 is an exploded perspective view of the locking structures of the present invention.
Figure 3:
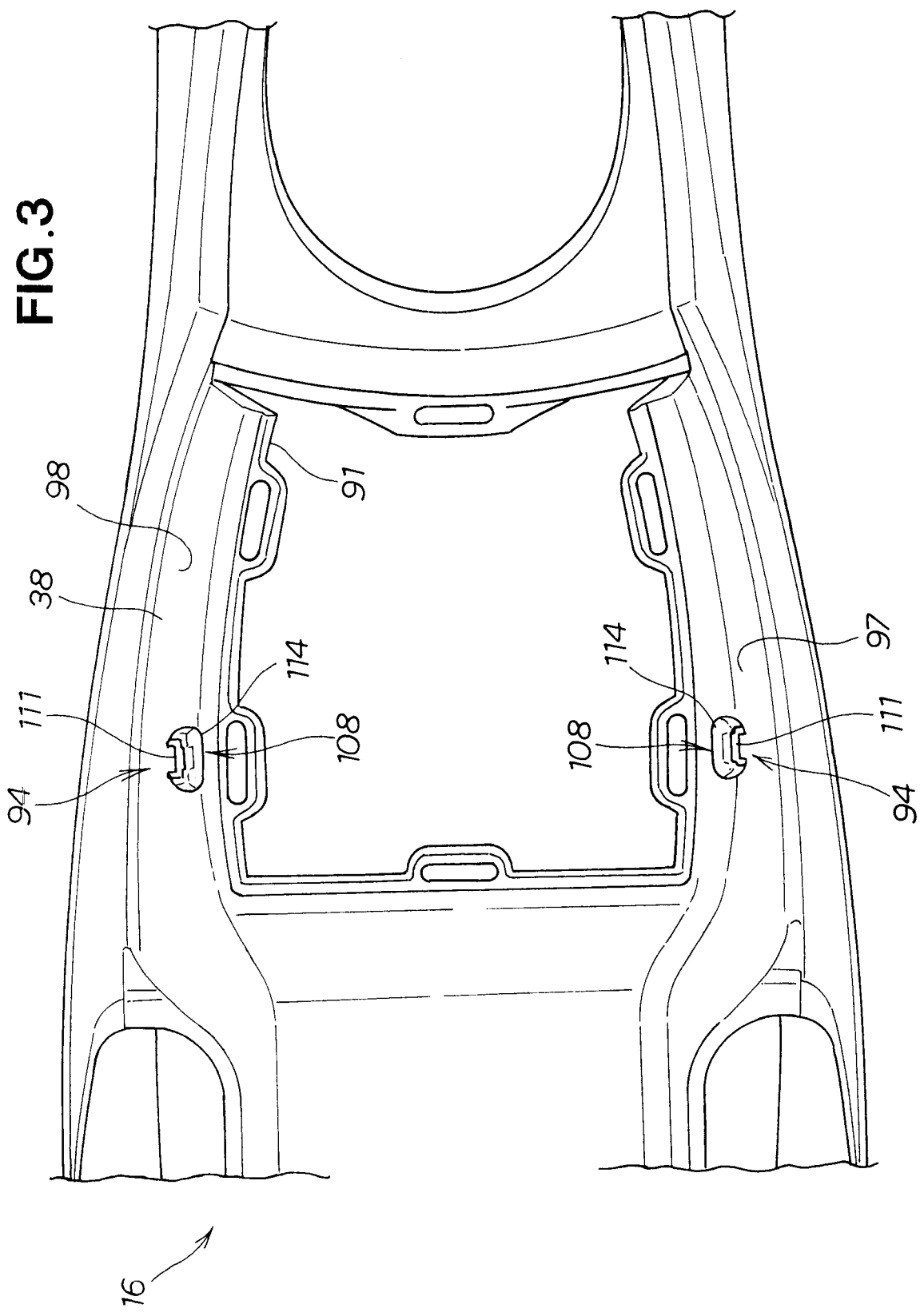
FIG. 3 is a plan view of locking clamp mechanisms of the locking structures of the present invention.

FIG. 2 is an exploded perspective view of the locking structures 94 of the present invention, and FIG. 3 is a plan view of locking clamp mechanisms of the locking structures 94.

The front storage section 21 and front cup holder 22 are formed by: a bottom plate member 92 being fitted in a bottom opening portion 91 of a recessed section 38 formed in a front portion of a console body 35; a box-shaped member 93, which is a desired object to be attached, being placed on the bottom plate member 92; and then the box-shaped member 93 being lockingly attached to and supported in the recessed section 38 of the console body 35 by means of the locking structures 94

The recessed section 38 has a left wall portion (first wall portion) 97, a right wall portion (second wall portion) 98 and the bottom opening portion 91, and the locking structures 94 are formed on the left and right wall portions 97 and 98, as will be later described.

The box-shaped member (i.e., desired object to be attached) 93 integrally has a left side wall 101 to be attached to the left wall portion 97 of the recessed section 38 of the center console 16, a right side wall 103 to be attached to the right wall portion 98 of the recessed section 38 in opposed relation to the left side wall 101, a front side wall 104, a rear side wall 105 opposed to the front side wall 104, and a cup support portion 106 formed on the rear side wall 105.

Each of the locking structures 94 includes a row of locking claw portions 107 formed on one of the left and right sides of the box-shaped member (desired object to be attached) 93 and arranged in parallel in a longitudinal direction of the center console 16, and a locking clamp mechanism 108 formed on one of the left and right wall portions 97 and 98 for engaging with the locking claw portions 107.

Figure 4:
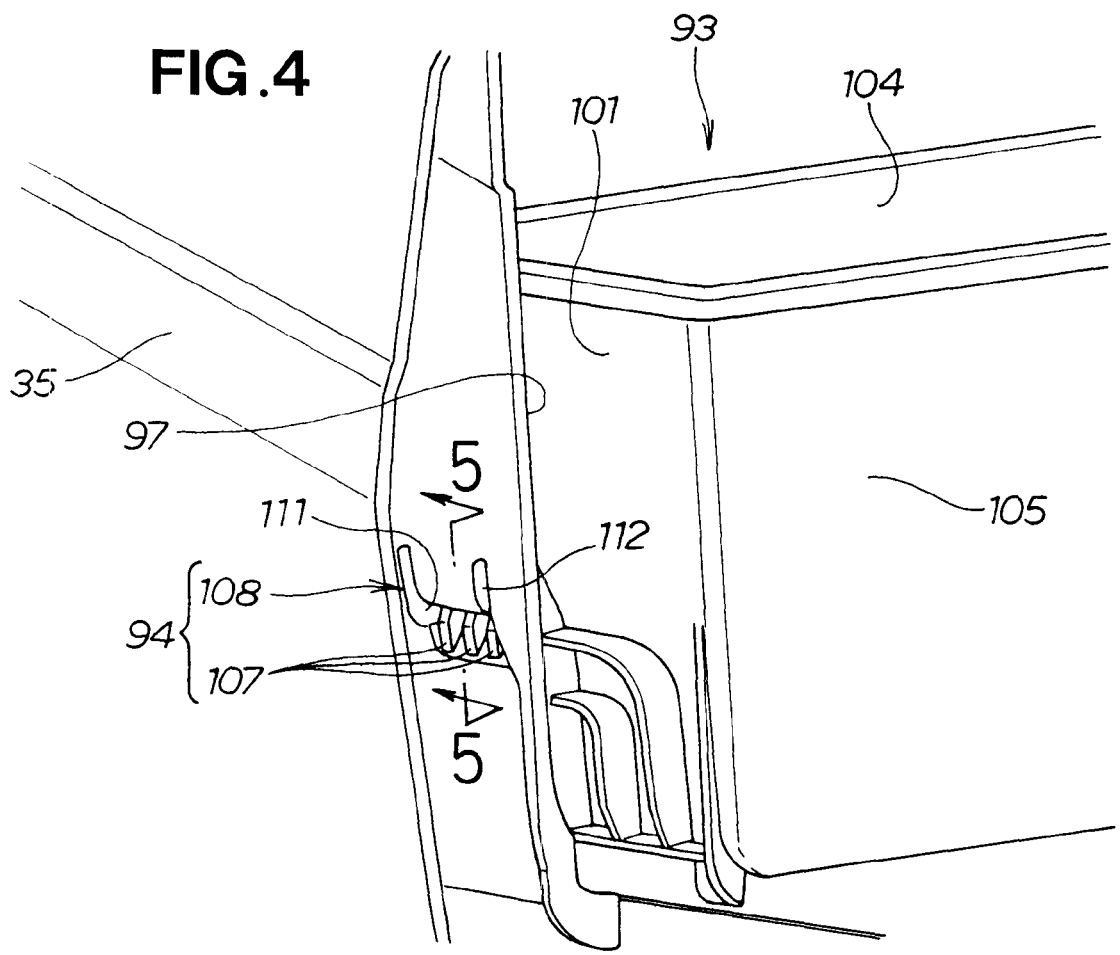
FIG. 4 is a perspective view explanatory of how each of the locking structures lockingly attaches a desired object to a wall portion of the center console.
Figure 5:
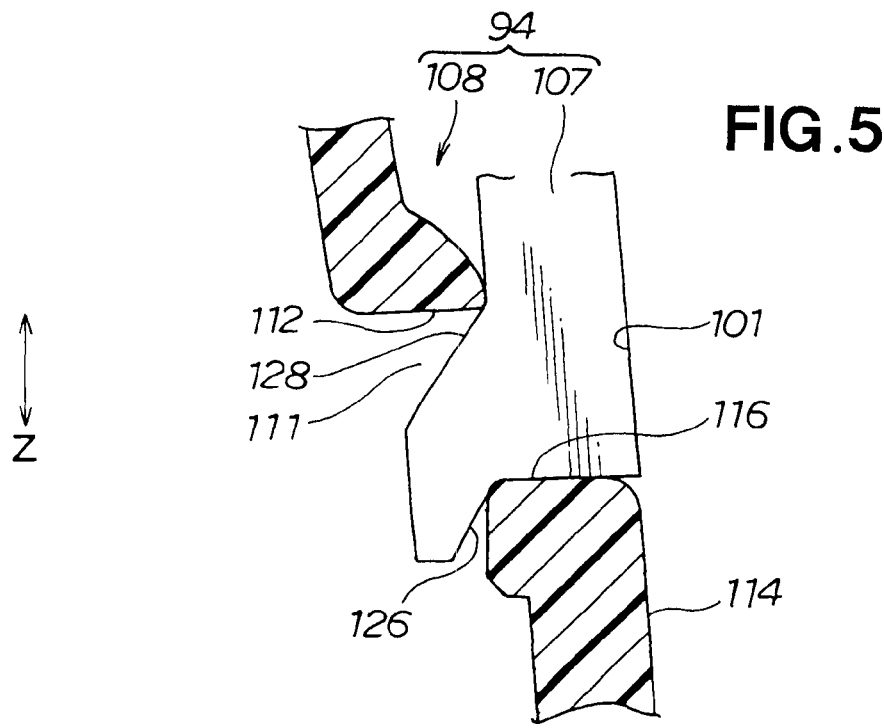
FIG. 5 is a sectional view taken along line 5-5 of FIG. 4.

FIG. 4 is a perspective view explanatory of how each of the locking structures 94 lockingly attaches the box-shaped member 93 to the center console, and FIG. 5 is a sectional view taken along the 5-5 line of FIG. 4.

In the left locking structure 94, as shown in FIG. 4, the locking clamp mechanism 108 has a fitting hole portion 111 formed in a region of the left wall portion 97 bulging toward a longitudinal centerline of the recessed section 38, the locking claw portions 107 are fittable in the fitting hole portion 111, and an elastic portion 112 resiliently presses the locking claw portions 107 fitted in the fitting hole portion 111. The locking clamp mechanism 108 of the right locking structure 94 is formed on the right wall portion 98 and constructed identically to the locking clamp mechanism 108 of the left locking structure 94, although not particularly shown.

Figure 6:
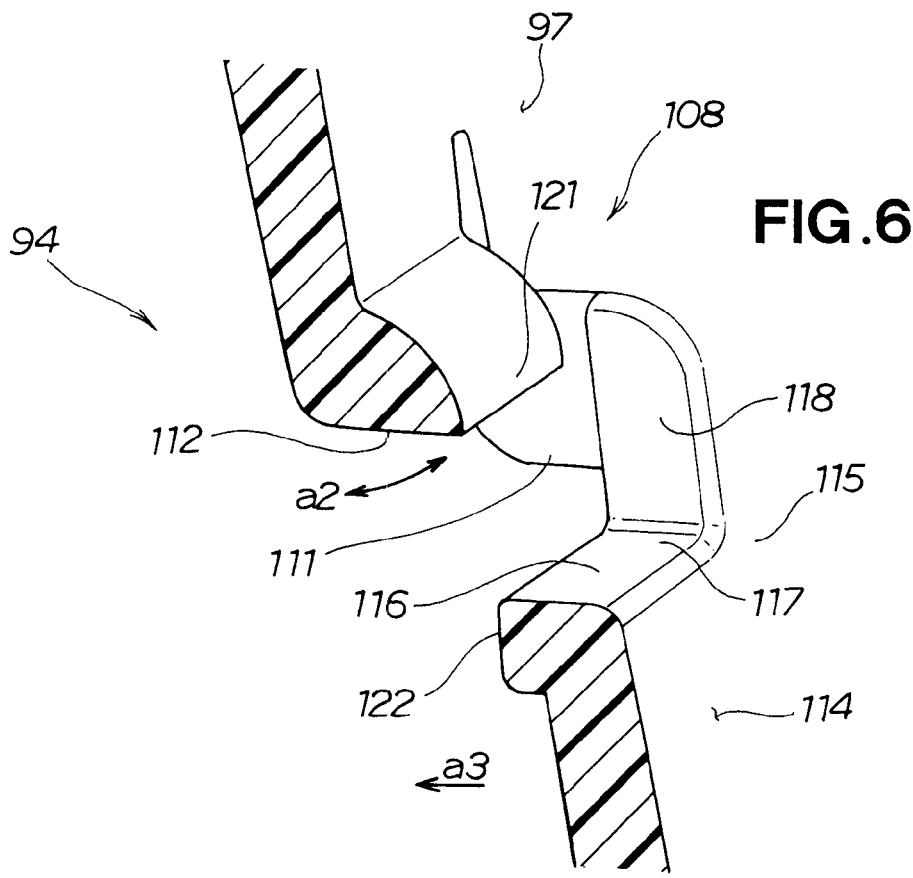
FIG. 6 is a sectional view of the locking clamp mechanism.
Figure 7:
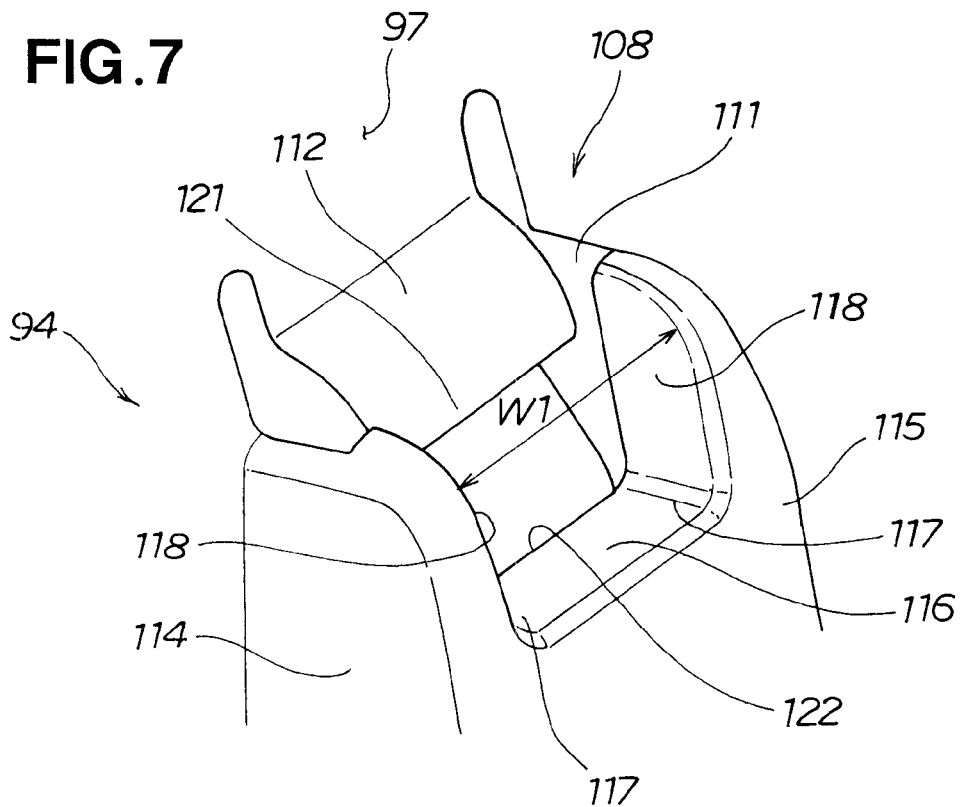
FIG. 7 is a perspective view of the locking clamp mechanism.

FIG. 6 is a sectional view of the locking clamp mechanism 108, and FIG. 7 is a perspective view of the locking clamp mechanism 108. The locking clamp mechanism 108 of the left locking structures 94 will be described below with combined reference to FIGS. 4, 5, 6 and 7; however, it should be appreciated that the same description below applies to the locking clamp mechanism 108 of the right locking structures 94 as well.

The locking clamp mechanism 108 has a base portion 114 formed on the left wall portion 97 and bulging horizontally from the left wall portion 97 by a relatively small amount; the fitting hole portion 111 formed between an upper end region 115 of the base portion 114 and a surface of the left wall portion 97; a locking support portion 116 concavely formed in the upper end region 115 of the base portion 114 adjacent to the fitting hole portion 111; a pair of opposed movement-preventing projecting portions 118 formed integrally with and extending perpendicularly upward from opposite ends 117 of the locking support portion 116; and the elastic portion 112 formed integrally with the left wall portion 97 and extending into a substantial center region of the fitting hole portion 111 in a cantilever fashion in such a manner that it is elastically or resiliently deformable in a direction of arrow a2. The two movement-preventing projecting portions 118 are spaced from each other by a distance W1 that corresponds to a total length of the row of the locking claw portions 107.

The elastic portion 112 has a pressing portion 121 formed at its distal end and projecting toward the locking claw portions 107 fitted in the fitting hole portion 111. With such a pressing portion 121, the elastic portion 112 can resiliently press the locking claw portions 107 against the locking support portion 116 (base portion 114) with an increased force and thereby prevent the locking claw portions 107 from returning upward out of the to resiliently-pressed engagement with the elastic portion 112.

The locking support portion 116 has an extension portion 122 extending outwardly (i.e., in a direction of arrow a3) away from the recessed section 38. With this extension portion 122, the locking support portion 116 can have an increased area of contact with the locking claw portions 107. As a consequence, the locking support portion 116 does not have to bulge toward the box-shaped member 93. Thus, not only the box-shaped member 93 can be formed to have an increased capacity, but also a surface pressure applied from the locking claw portions 107 to the locking support portion 116 can be reduced so that the locking support portion 116 can have an increased strength.

Figure 8:
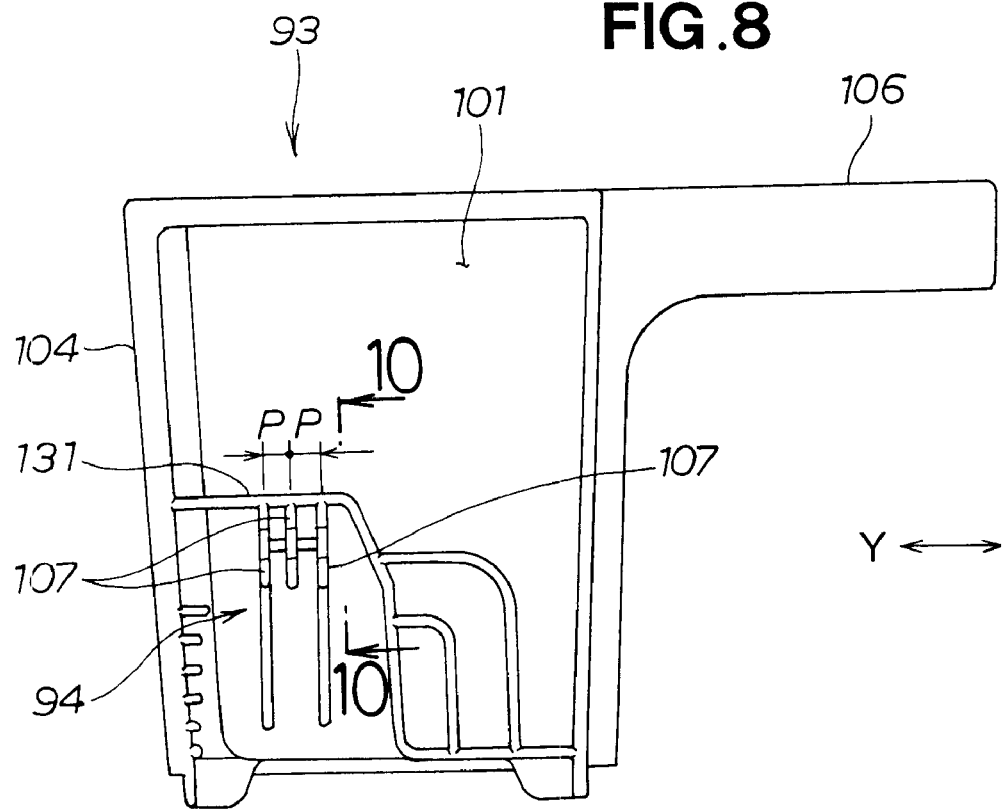
FIG. 8 is a view taken in a direction of arrow 8 of FIG. 2.
Figure 9:
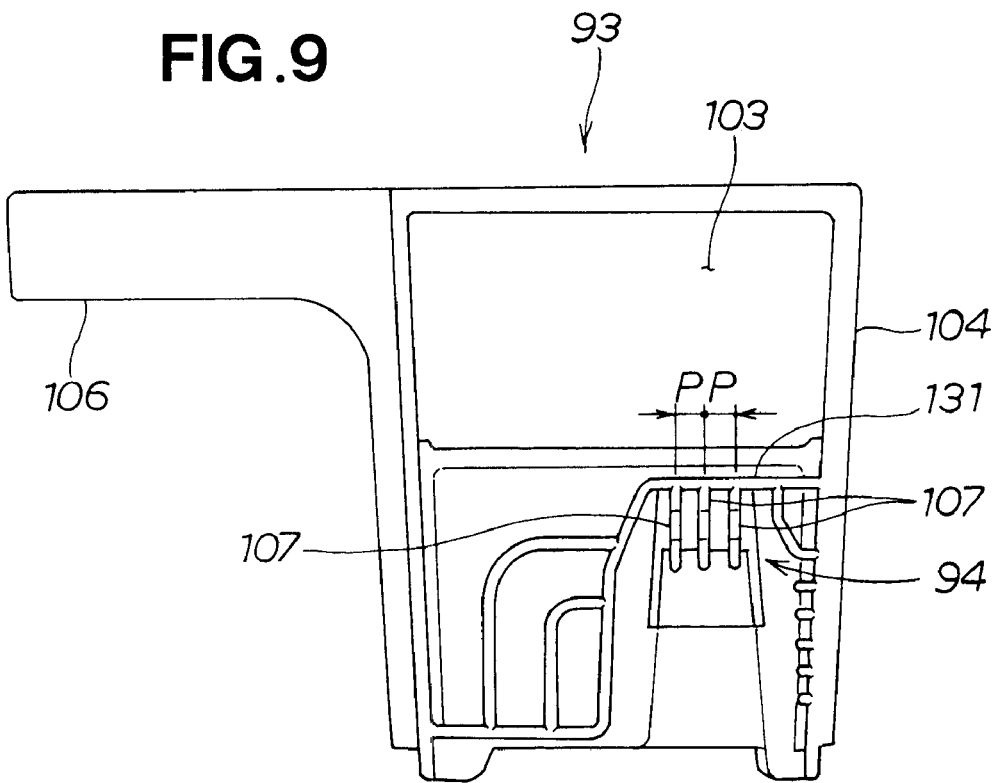
FIG. 9 is a view taken in a direction of arrow 9 of FIG. 2.
Figure 10:
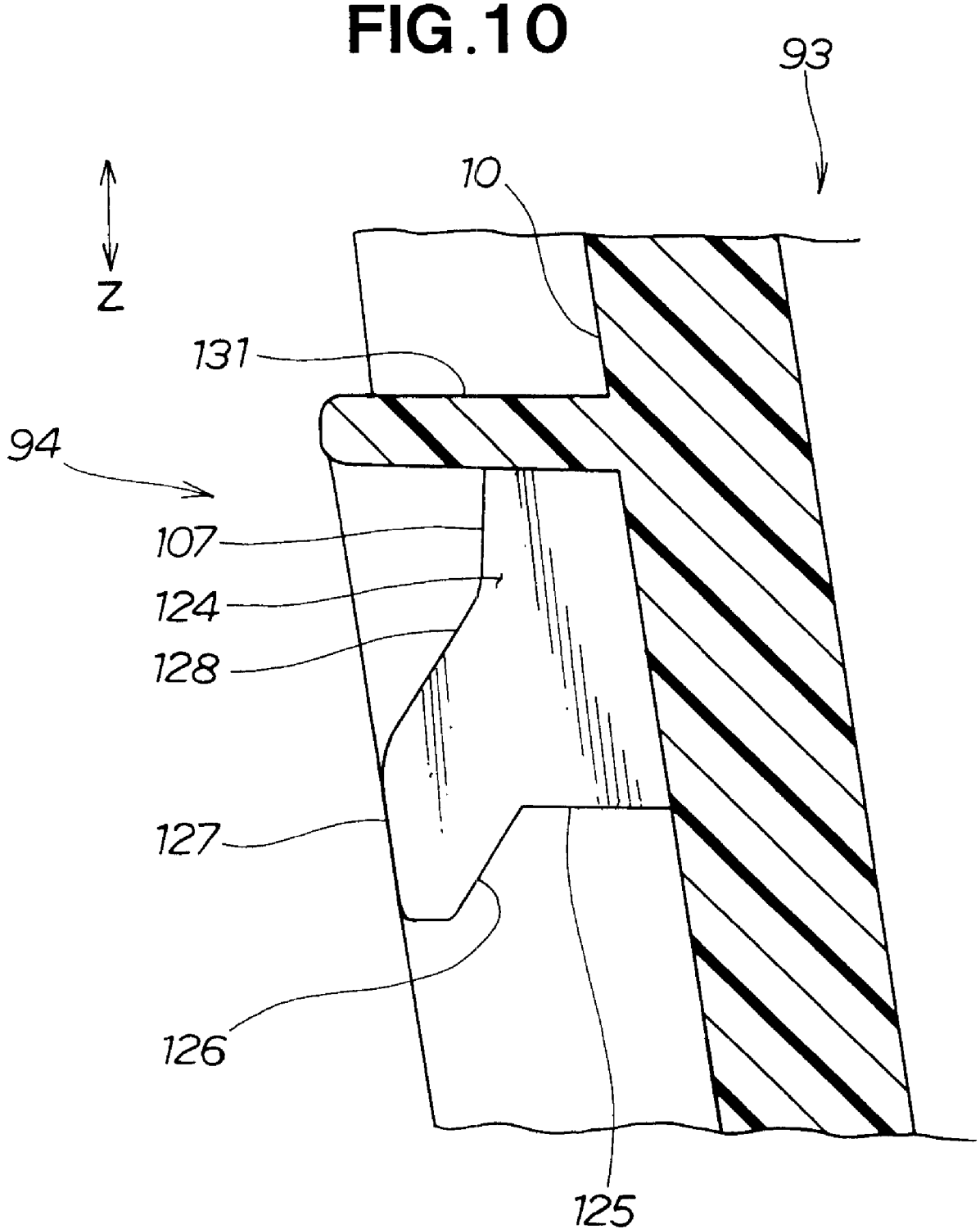
FIG. 10 is a sectional view taken along line 10-10 of FIG. 8.

FIG. 8 is a view taken in a direction of arrow 8 of FIG. 2, which shows the left side of the box-shaped member (desired object to be attached) 93. FIG. 9 is a view taken in a direction of arrow 9 of FIG. 2, which shows the right side of the box-shaped member 93. FIG. 10 is a sectional view taken along the 10-10 line of FIG. 8.

Each of the locking claw portions 107 integrally has a vertical body 124 extending in a vertical direction (i.e., Z-axis direction) along the left wall portion 97; an abutment portion 125 formed at the lower end of the vertical body 124 that abuts face to face against the locking support portion 116 to rest on the locking support portion 116; an engaging portion 126 continuous with the abutment portion 125 and extending obliquely downward away from the abutment portion 125; an elastic-portion-guided portion 127 continuous with the engaging portion 126 and having a surface extending substantially parallel to the left wall portion 97; and a slip-out-preventing slant portion 128 continuous with the elastic-portion-guided portion 127 and having a surface extending substantially parallel to the slanting engaging portion 126. In the illustrated example, three such locking claw portions 107 are provided in parallel to one another at predetermined pitches P. These locking claw portions 107 are integrally interconnected at the upper ends of their respective vertical body 124 via a connection portion 131, to increase their strength against falling in the longitudinal direction or Y-axis direction of the console 16.

Whereas three locking claw portions 107 are formed on each of the opposite (left and right) sides of the box-shaped member (desired object to be attached) 93 in the illustrated example, only one locking claw portion 107 may be formed on each of the opposite sides of the box-shaped member 93 or on only one of the opposite sides, depending on conditions, such as a total weight of the box-shaped member 93 and contents therein. However, it is preferable to provide at least two locking claw portions 107 on each of the opposite sides of the box-shaped member 93. More than three locking claw portions 107 may be formed on each of the opposite sides of the box-shaped member 93.

Next, a description will be given about behavior of each of the locking structures 94 of the present invention, with combined reference to FIGS. 2-10.

First, as the locking claw portions 107 formed on the left side wall 101 of the box-shaped member (desired object to be attached) 93 and the locking claw portions 107 formed on the right side wall 103 are positioned substantially parallel to the left (or first) wall portion 97 and right wall (or second) portion 98 (i.e., substantially parallel to the Z axis) and then fitted into the corresponding (i.e., left and right) fitting hole portions 111 against the resiliency of the elastic portions 112 of the clamp mechanism 108. As seen in FIG. 3, the abutment portions 125 of the locking claw portions 107 abut against the corresponding locking support portions 116. Because the left and right locking support portions 116 bulge from the corresponding left and right wall portions 97 and 98 by only a small amount and the left and right locking claw portions 107 bulge from the corresponding left and right walls 101 and 103 by only a small amount, the box-shaped member (desired object to be attached) 93 can be disposed very close to the left and right wall portions 97 and 98 with a minimized space between the left and right wall portions 97 and 98 and the box-shaped member (desired object to be attached) 93.

Further, as the left and right locking claw portions 107 of the box-shaped member (desired object to be attached) 93 are fitted into the fitting hole portion 111 against the resiliency of the elastic portions 112, the elastic portions 112 are pressed by the locking claw portions 107 to be elastically deformed outwardly. Thus, the locking claw portions 107 can be readily fitted into the fitting hole portions 111 without being interfered with by the elastic portions 112.

Further, because the abutment portions 125 of the locking claw portions 107 abut against the locking support portions 116, it can be readily confirmed, from the abutment against the locking support portions 116, that the locking claw portions 107 have been fitted in a predetermined position in the corresponding fitting hole portions 111.

Further, as the locking claw portions 107 are fitted into the corresponding fitting hole portions 111, the locking claw portions (i.e., frontmost and rearmost locking claw portions) 107 are brought into face-to-face abutment against the movement-preventing projecting portions 118, so that the box-shaped member (desired object to be attached) 93 can be effectively prevented from undesirably jolting in the longitudinal direction (i.e., Y-axis direction) of the center console 16. Thus, the box-shaped member 93 can be reliably lockingly supported in a predetermined position with no jolting or displacement in the Y-axis direction of the center console 16.

Further, as the locking claw portions 107 are fitted into the fitting hole portion 111, the engaging portions 126 of the locking claw portions 107 are brought into abutment against the locking support portions 116. Thus, not only the box-shaped member (desired object to be attached) 93 can be effectively prevented from undesirably jolting in the direction perpendicular to the left and right wall portions 97 and 98 (i.e., in the X-axis direction), but also the box-shaped member (desired object to be attached) 93 can be reliably lockingly supported in the predetermined position without being detached from the left and right wall portions 97 and 98.

Furthermore, as the locking claw portions 107 are fitted into the corresponding fitting hole portions 111, the elastic portions 112 are resiliently deformed so as to resiliently press the slip-out-preventing slant portions 128 against the locking support portions 116 of the base portion 114, the locking claw portions 107 can be prevented from accidentally slipping away from the locking support portions 116. Thus, not only the locking claw portions 107 can be effectively prevented from jolting in their fitting direction (i.e., in the Z-axis direction). As a result, the box-shaped member (desired object to be attached) 93 can be lockingly supported in the predetermined position with an even further enhanced reliability.

Whereas the locking structure of the present invention has been described above as applied to a center console of a vehicle, it can be applied to other components, such as other storage units, of vehicles.

The locking structure of the present invention is particularly well suited for attaching a box-shaped member to a recessed section of a center console of a vehicle.

What is claimed is:

1. A locking structure for lockingly attaching a desired object to at least one wall portion of a center console device, which comprises:
   a locking claw portion formed on the desired object; and
   a locking clamp mechanism formed on the wall portion of the center console device, said locking clamp mechanism having:
   a fitting hole portion formed in the wall portion for fitting therein the locking claw portion of the desired object;
   a locking support portion for lockingly supporting the locking claw portion fitted in said fitting hole portion;
   a pair of opposed movement-preventing projecting portions formed on opposite ends of said locking support portion for preventing movement of the desired object between the opposite ends, said pair of opposed movement-preventing projecting portions being disposed so as to simultaneously abut opposing sides of the locking claw portion fitted in said fitting hole portion; and an elastic portion extending from the wall portion for resiliently pressing said locking claw portion against said locking support portion.

2. A locking structure for lockingly attaching a desired object having first and second opposite sidewalls to first and second opposed wall portions of a center console device, which comprises:
   a first locking claw portion formed on the first sidewall of the desired object;
   a second locking claw portion formed on the second sidewall of the desired object;
   a first locking clamp mechanism formed on the first wall portion of the center console device; and
   a second locking clamp mechanism formed on the second wall portion of the center console,
      wherein each of said locking clamp mechanisms have:
         a fitting hole portion formed in the respective wall portion for fitting therein one of the first and second locking claw portions of the desired object;
         a locking support portion for lockingly supporting the locking claw portion fitted in said fitting hole portion;
         a pair of opposed movement-preventing projecting portions formed on opposite ends of said locking support portion for preventing movement of the desired object between the opposite ends, said pair of opposed movement-preventing projecting portions being disposed so as to simultaneously abut opposing sides of the locking claw portion fitted in said fitting hole portion; and
         an elastic portion extending from the wall portion for resiliently pressing said locking claw portion fitted in said fitting hole against said locking support portion.

3. A center console having a recessed section defined in part by a wall portion with a desired object lockingly attached to the wall portion by at least one locking structure, wherein each locking structure comprises:
   a locking claw portion formed on the desired object; and
   a locking clamp mechanism formed on the wall portion of the center console, the locking clamp mechanism having:
      a fitting hole portion formed in the wall portion for fitting therein of the locking claw portion of the desired object;
      a locking support portion for lockingly supporting the locking claw portion fitted in said fitting hole portion;
      a pair of opposed movement-preventing projecting portions formed on opposite ends of said locking support portion for preventing movement of the desired object between the opposite ends; and
      an elastic portion extending from the wall portion for resiliently pressing said locking claw portion against said locking support portion.

4. The center console according to claim 3, wherein said pair of opposed movement-preventing projecting portions are disposed so as to simultaneously abut opposing sides of the locking claw portion fitted in said fitting hole portion.

5. A console having a recessed section defined in part by a wall portion with a desired object lockingly attached to the wall portion by at least one locking structure, wherein each locking structure comprises:
   a locking claw portion formed on the desired object; and
   a locking clamp mechanism formed on the wall portion of the console, the locking clamp mechanism having:
      a fitting hole portion formed in the wall portion for fitting therein of the locking claw portion of the desired object;
      a locking support portion for lockingly supporting the locking claw portion fitted in said fitting hole portion;
      a pair of opposed movement-preventing projecting portions formed on opposite ends of said locking support portion for preventing movement of the desired object between the opposite ends; and
   an elastic portion extending from the wall portion for resiliently pressing said locking claw portion against said locking support portion,
   wherein the at least one locking structure comprises a first locking structure and a second locking structure, wherein the first and second locking structures are opposed to one another across the recessed section of the console.

6. The console according to claim 5,
   wherein the recessed section of the console is defined by a bottom plate and the wall portion, wherein the wall portion has a first section and a second section that are opposed to one another,
   wherein the desired object has a first sidewall and a second sidewall disposed opposite to the first sidewall, and
   wherein the first section of the wall portion has the locking clamp mechanism of the first locking structure formed thereon, the second section of the wall portion has the locking clamp mechanism of the second locking structure formed thereon, the first sidewall of the desired object has the locking claw portion of the first locking structure formed thereon, and the second sidewall of the desired object has the locking claw portion of the second locking structure formed thereon.

7. The console according to claim 6, wherein at least a part of the locking support portion projects into the recessed section of the console.

8. The console according to claim 7, wherein the first and second sidewalls of the desired object each define an indent and the locking claw portion is provided in said indent.

9. The console according to claim 8, wherein a distance between the first and second sidewalls of the desired object is substantially equal to a distance between the first and second sections of the wall portion of the recessed section of the console.

* * * * *